US008341012B2

(12) United States Patent
Yamanaka et al.

(10) Patent No.: US 8,341,012 B2
(45) Date of Patent: Dec. 25, 2012

(54) WORKING SKILL ESTIMATING PROGRAM

(75) Inventors: Hideki Yamanaka, Kawasaki (JP); Takashi Yanase, Kawasaki (JP); Isao Namba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 2034 days.

(21) Appl. No.: 11/189,825

(22) Filed: Jul. 27, 2005

(65) Prior Publication Data

US 2006/0210052 A1    Sep. 21, 2006

(30) Foreign Application Priority Data

Mar. 17, 2005  (JP) ................................ 2005-077314

(51) Int. Cl.
G06Q 10/00         (2012.01)
(52) U.S. Cl. ...................... 705/7.41; 705/7.39; 705/7.14; 705/7.12; 705/7.11; 370/270; 379/265.01; 379/265.02; 379/265.06; 379/265.12
(58) Field of Classification Search .................. None
See application file for complete search history.

(56) References Cited

U.S. PATENT DOCUMENTS

| | | | | |
|---|---|---|---|---|
| 5,825,869 A * | 10/1998 | Brooks et al. | ............ | 379/265.12 |
| 5,946,375 A * | 8/1999 | Pattison et al. | ............ | 379/112.01 |
| 6,044,355 A * | 3/2000 | Crockett et al. | ................... | 705/8 |
| 6,081,592 A * | 6/2000 | Battle | ............................. | 379/309 |
| 6,163,607 A * | 12/2000 | Bogart et al. | ............ | 379/266.01 |
| 6,349,325 B1 * | 2/2002 | Newcombe et al. | ........... | 709/202 |
| 6,363,411 B1 * | 3/2002 | Dugan et al. | ................... | 709/202 |
| 6,424,709 B1 * | 7/2002 | Doyle et al. | ............. | 379/265.02 |
| 6,453,038 B1 * | 9/2002 | McFarlane et al. | ....... | 379/265.05 |
| 6,459,787 B2 * | 10/2002 | McIllwaine et al. | ..... | 379/265.06 |
| 6,459,788 B1 * | 10/2002 | Khuc et al. | ............... | 379/265.09 |
| 6,473,505 B1 * | 10/2002 | Khuc et al. | ............... | 379/265.01 |
| 6,574,605 B1 * | 6/2003 | Sanders et al. | ..................... | 705/8 |
| 6,584,191 B1 * | 6/2003 | McPartlan et al. | ........ | 379/265.02 |
| 6,603,854 B1 * | 8/2003 | Judkins et al. | ............ | 379/265.06 |
| 6,690,664 B1 * | 2/2004 | Khuc et al. | ...................... | 370/352 |
| 6,690,788 B1 * | 2/2004 | Bauer et al. | .................... | 379/242 |
| 6,700,971 B1 * | 3/2004 | Cohen et al. | .............. | 379/265.06 |
| 6,711,253 B1 * | 3/2004 | Prabhaker | ................ | 379/265.01 |
| 6,731,744 B1 * | 5/2004 | Khuc et al. | ............... | 379/265.01 |
| 6,735,436 B1 * | 5/2004 | McCauley et al. | ............ | 455/424 |
| 6,744,878 B1 * | 6/2004 | Komissarchik et al. | . | 379/265.03 |
| 6,747,957 B1 * | 6/2004 | Pithawala et al. | ............. | 370/252 |
| 6,850,613 B2 * | 2/2005 | McPartlan et al. | ....... | 379/265.02 |

(Continued)

OTHER PUBLICATIONS

Patent Abstracts of Japan, Publication No. 2005-258551, Published Sep. 22, 2005.

(Continued)

*Primary Examiner* — Romain Jeanty
*Assistant Examiner* — Brett Feeney
(74) *Attorney, Agent, or Firm* — Staas & Halsey LLP

(57) ABSTRACT

A working skill estimating program is provided for estimating working skills of each agent in the state of separating a disturbance factor from response records (incidents). A large category classifier is supplied with the incidents within a predetermined time and classifies the incidents according to classification rules, for creating the topic-classified incidents. A small category generator collects the analogous incidents for each task type of the topic-classified incidents and generates a small category. A disturbance distinguisher distinguishes if the incidents belonging to each small category are common response records that appear regularly over time or disturbances whose frequency exhibits a significant time dependency. Then, a skill estimator estimates the working skills of each agent for each task type by using only common incidents determined as the common information.

13 Claims, 17 Drawing Sheets

U.S. PATENT DOCUMENTS

| | | | | |
|---|---|---|---|---|
| 6,970,829 | B1* | 11/2005 | Leamon | 705/7.14 |
| 7,028,250 | B2* | 4/2006 | Ukrainczyk et al. | 715/202 |
| 7,043,004 | B1* | 5/2006 | Khuc et al. | 379/265.01 |
| 7,072,966 | B1* | 7/2006 | Benjamin et al. | 709/228 |
| 7,386,467 | B2* | 6/2008 | Eitel et al. | 705/11 |
| 7,389,306 | B2* | 6/2008 | Schuetze et al. | 707/104.1 |
| 7,457,279 | B1* | 11/2008 | Scott et al. | 370/352 |
| 7,624,007 | B2* | 11/2009 | Bennett | 704/9 |
| 7,720,214 | B2* | 5/2010 | Ricketts | 379/265.02 |
| 7,848,947 | B1* | 12/2010 | McGloin et al. | 705/7.42 |
| 7,873,155 | B2* | 1/2011 | Yanase et al. | 379/265.05 |
| 8,139,756 | B2* | 3/2012 | Yamanaka | 379/265.12 |
| 2001/0032120 | A1* | 10/2001 | Stuart et al. | 705/11 |
| 2002/0018554 | A1* | 2/2002 | Jensen et al. | 379/265.01 |
| 2002/0022956 | A1* | 2/2002 | Ukrainczyk et al. | 704/9 |
| 2002/0143597 | A1* | 10/2002 | Andre et al. | 705/9 |
| 2002/0143862 | A1* | 10/2002 | Peterson | 709/203 |
| 2003/0187809 | A1* | 10/2003 | Suermondt et al. | 706/46 |
| 2003/0212984 | A1* | 11/2003 | Miyazaki et al. | 717/116 |
| 2003/0215083 | A1* | 11/2003 | McPartlan et al. | 379/265.02 |
| 2003/0229529 | A1* | 12/2003 | Mui et al. | 705/8 |
| 2004/0049473 | A1* | 3/2004 | Gower et al. | 706/46 |
| 2004/0218806 | A1* | 11/2004 | Miyamoto et al. | 382/145 |
| 2005/0065967 | A1* | 3/2005 | Schuetze et al. | 707/102 |
| 2005/0201546 | A1* | 9/2005 | Yanase et al. | 379/265.12 |
| 2005/0216421 | A1* | 9/2005 | Barry et al. | 705/64 |
| 2006/0020509 | A1* | 1/2006 | Strain et al. | 705/14 |
| 2006/0026179 | A1* | 2/2006 | Brown et al. | 707/100 |
| 2006/0146806 | A1* | 7/2006 | Khuc et al. | 370/352 |
| 2007/0156696 | A1* | 7/2007 | Lim | 707/9 |
| 2007/0206770 | A1* | 9/2007 | Yamanaka | 379/265.01 |
| 2008/0208644 | A1* | 8/2008 | Gray et al. | 705/7 |

OTHER PUBLICATIONS

Patent Abstracts of Japan, Publication No. 2001-318583, Published Nov. 16, 2001.

Patent Abstracts of Japan, Publication No. 2004-164344, Published Jun. 10, 2004.

"A Survey of Recent Clustering Methods for Data Mining (part 1)", Toshihiro Kamishima, National Institute of Advanced Industrial Science and Technology (AIST), pp. 59-65.

Japanese Patent Office Action dated Oct. 28, 2008 in corresponding Japanese Appln. No. 2005-077314.

Hideki Yamanaka et al., "An Automatic Skills Estimation Technique for Support Center Agents and its Application to Simulations," Papers from Forum on Information Technology (FIT 2004), vol. 4, The Institute of Electronics Information and Communication Engineers, Information Processing Society of Japan, Aug. 20, 2004, pp. 401-402, Table of Contents and Cover page (8 total pages).

"Analytical Technique for Consulting Service," Fujitsu Journal, Fujitsu Limited, May 31, 2004, vol. 30, No. 5, pp. 14, 15 and cover page (3 total pages).

Isao Namba et al., "Question Answering Retrieval for Log Using Pseudo Frequency," Technical Report of IEICE, The Institute of Electronics Information and Communication Engineers, Mar. 7, 2002, vol. 101, No. 712, pp. 101-108, Table of Contents and Cover Page (11 total pages).

* cited by examiner

FIG. 4

230 SCREEN ON WHICH RESPONSES TO CUSTOMERS ARE TO BE SPECIFIED

■ PHONE RESPONSE RECORD

ARRIVAL: 10/10/2004 13:50:24  231
END: 10/10/2004 14:15:17  232
DESTINATION: 7113-5402  233

■ RESPONSE CONTENT RECORD

START: 10/10/2004 13:50:30  234
END: 10/10/2004 14:20:17  235
AGENT ID: 00013 (PHONE 7113-5402)  236
INQUIRY: UNABLE TO CONNECT TO THE INTERNET  237
RESPONSE: AN ERROR FOUND IN ADSL SETTINGS AS A RESULT OF CHECKING SETUPS  238

FIG. 5

500 INCIDENT

| INCIDENT ID | CREATION START DAY AND TIME 501 | CREATION END DAY AND TIME 502 | INQUIRY CONTENT (TEXT) 503 | RESPONSE CONTENT (TEXT) 504 |
|---|---|---|---|---|
| 5230001 | 01/24/2005 09:23:34 | 01/24/2005 09:31:21 | UNABLE TO CONNECT TO THE INTERNET. | CHECK FOR CONNECTION OF A LAN CABLE. |
| 5230002 | 01/24/2005 09:24:11 | 01/24/2005 09:30:52 | APPLY FOR ENROLLMENT. | SERVICE IS AVAILABLE TOMORROW. |
| ... | ... | ... | ... | ... |

CLASSIFICATION RULES 510

| KEYWORDS 511 | | | | LARGE CATEGORY NAME 512 |
|---|---|---|---|---|
| KEYWORD 1 | KEYWORD 2 | ... | KEYWORD n | |
| INTERNET | CONNECT(ION) | | | INTERNET CONNECTION |
| ENROLLMENT | APPLY | | | MEMBERSHIP MANAGEMENT |
| WITHDRAW MEMBERSHIP | | | | MEMBERSHIP MANAGEMENT |
| ... | ... | ... | ... | ... |

FIG. 6

| TOPIC-CLASSIFIED INCIDENT 520 | | | | | |
|---|---|---|---|---|---|
| INCIDENT ID | CREATION START DAY AND TIME | CREATION END DAY AND TIME | INQUIRY WORD LIST 521 | RESPONSE WORD LIST 522 | TOPIC (LARGE CATEGORY) 523 |
| 5230001 | 01/24/2005 09:23:34 | 01/24/2005 09:31:21 | ((("INTERNET", 1) ("CONNECT(ION)", 1)) | ((("LAN CABLE", 2) ("CONNECT(ION)", 3)) | INTERNET CONNECTION |
| 5230002 | 01/24/2005 09:24:11 | 01/24/2005 09:30:52 | ((("ENROLLMENT", 1) ("APPLY", 1)) | ((("SERVICE", 1) ("USE", 2)) | MEMBERSHIP MANAGEMENT |
| ... | ... | ... | ... | ... | |

OUTPUT INFORMATION OF DISTURBANCE DISTINGUISHER — 530

| INCIDENT ID | CREATION START DAY AND TIME | CREATION END DAY AND TIME | TOPIC | SMALL CATEGORY | DISTURBANCE-DISTINGUISHED RESULT |
|---|---|---|---|---|---|
| | | | 531 | 532 | 533 |
| 4950101 | 01/24/2005 09:23:34 | 01/24/2005 09:31:21 | RECOVERY | CAT00523 | BALANCE |
| 4950104 | 01/24/2005 09:33:54 | 01/24/2005 09:51:11 | RECOVERY | CAT00012 | BALANCE |
| 4952923 | 01/24/2005 09:44:11 | 01/24/2005 09:59:52 | RECOVERY | CAT01003 | DISTURBANCE |
| 4953079 | 01/24/2005 10:25:32 | 01/24/2005 10:40:22 | RECOVERY | CAT00173 | DISTURBANCE |
| ... | | | | ... | |

540 AGENT'S SKILL TABLE

| TOPIC (LARGE CATEGORY) | MEMBERSHIP MANAGEMENT | INTERNET CONNECTION | RECOVERY | COMPLAINT | ... |
|---|---|---|---|---|---|
| AGENT A | 100 | 160 | 120 | 180 | ... |
| AGENT B | 100 | 80 | 100 | 70 | ... |
| ... | ... | ... | ... | ... | |

550 DISTURBANCE INFLUENCE TABLE

| TOPIC (LARGE CATEGORY) | MEMBERSHIP MANAGEMENT | INTERNET CONNECTION | RECOVERY | COMPLAINT | ... |
|---|---|---|---|---|---|
| a (PREVIOUS MONTH RELATIVE PRODUCTIVITY) | 80% | 120% | 100% | 30% | |
| p (RATIO OF PREVIOUS MONTH COMMON PORTION) | 70% | 90% | 85% | 50% | |
| b (THIS MONTH RELATIVE PRODUCTIVITY) | 85% | 90% | 120% | 40% | |
| q (RATIO OF THIS MONTH COMMON PORTION) | 80% | 80% | 60% | 60% | |
| DISTURBANCE INFLUENCE DEGREE | +3% | -4% | +8% | +17% | |

WORKING SKILL ESTIMATING PROGRAM

CROSS-REFERENCE TO RELATED APPLICATIONS

This application is based upon and claims the benefits of priority from the prior Japanese Patent Application No. 2005-077314, filed on Mar. 17, 2005, the entire contents of which are incorporated herein by reference.

BACKGROUND OF THE INVENTION (1) Field of the Invention

The present invention relates to a working skill estimating program, and more particularly to a working skill estimating program for estimating working skills of an agent based on response records collected during a predetermined period, each response record containing information about an inquiry from a customer, a response thereto, and time spent therefor.

(2) Description of the Related Art

In an online support center, agents accept various kinds of inquiries from customers and respond to those inquiries. Their supervisor has been required to grasp the working skills of each agent for enhancing the efficiency of support center management. Concretely, for making the management more efficient, the supervisor is required to grasp the working skills of each agent and to distribute the task of responding to each customer's inquiry to an appropriate agent, taking his or her working skills into consideration. The supervisor should also train each agent properly according to his or her current working skills so that he or she will be able to provide better customer service.

Conventionally, the working skills of an agent have been estimated on the basis of the average number of cases he or she can process per unit time. Each agent ordinarily has tasks of two sorts, responding to inquiries asked by customers through phone or the like and registering its record in a database provided in a support center. Under these conditions, the supervisor obtains an incoming time and an end time of each phone conversation, a time when a response record (referred to as an incident) is opened for registering the incident in the database, a time when the registration is ended and the incident is closed, and so forth, for calculating a time taken in responding to each customer. Based on the calculated time, the supervisor estimates the working skill levels of each agent in light of the knowledge that skillful agents respond more quickly than unskilled agents.

As another method of estimating the working skills of an agent, the following method has been proposed: Every agent is supposed to write a particular file in the course of each customer support activity. Agent terminals are linked to an administration server on the network, and each time an agent writes some data to the special file, the supervisor server is notified of the amount of write data. The resulting collection of records permits the supervisor server to evaluate the skills of each agent, based on the frequency of file access and the amount of write data. (For example, refer to the paragraph numbers [0016] to [0045] and FIG. 1 in the Official Gazette of Japanese Unexamined Patent Publication No. 2004-164344.)

However, the conventional working skill estimation involves the shortcoming of having difficulty in grasping the proper working skills of each agent because the variety of apparent working skills of each agent occurs according to a variety of inquiries.

Conventionally, the customer responding time has been estimated on the basis of the incidents registered about the ordinary tasks. In the ordinary tasks, the inquiries are varied by various factors. For example, as to an inquiry about a computer virus, as the damages caused by the computer virus have spread in society, more inquiries are asked. However, when the measures for the computer virus are completed in most computers, the inquiries thereabout are abruptly decreased. Further, in a case that a defect on hardware or a security hole on software is found, until some later date after it was made public, more inquiries are asked. However, several weeks later, for example, the inquiries are decreased. On the other hand, the inquiries for requesting the catalogues and handling the products are kept substantially constant in number.

As mentioned above, the change of the customer responding time results from the change of the agent's working skills or the change of the difficulty in responding to each inquiry. It is thus difficult to clearly distinguish the cause of the change of the responding time. The time of responding to the customers' inquiries characterized to frequently take place during some days (or weeks or months) but to be stopped some days later does not substantially depend upon the working skills of each agent. Further, if each agent is trained about these kinds of inquiries, the training is not so effective because those inquiries are likely to be decreased as days are going. Hence, those kinds of inquiries are not proper to estimating the working skills of each agent. Hereafter, those transient kinds of inquiries are called a disturbance. Conventionally, for removing such disturbances, for example, a supervisor has made sure of an incident, separated the incident if it is determined to be a disturbance from the other incidents, and estimated the working skills of each agent based on the remaining incidents. However, the determination as to whether or not the incident is the disturbance is burdensome to the supervisor. Further, it is difficult to intuitively determine if the incident is the disturbance. This means the disturbances may not be properly separated.

Further, the method of estimating the results according to the amount of data when writing the data in a file is proper to the case in which an agent repeats writing of the same file. However, this method is not proper to estimating the working skills of the agent who responds to the customers' inquiries whose contents are largely changed.

SUMMARY OF THE INVENTION

The present invention is made in consideration of the foregoing respects, and it is an object of the present invention to provide a working skill estimating program which provides a capability of grasping a proper working skills of each agent based on a response record in which the response to an inquiry with a disturbance factor like the change of content is recorded.

In carrying out the foregoing object, the present invention provides a working skill estimating program for estimating working skills of an agent based on response records collected during a predetermined period, each response record containing information about an inquiry from a customer, a response thereto, and time spent therefor. This program makes a computer function as: a large category classifying unit for classifying the response records into large categories according to predetermined classification rules based on topics of inquiries and responses; a small category generating unit for generating small categories by further classifying the response records belonging to each of the large categories according to a predetermined definition of similarity between individual response records; a disturbance distinguishing unit for distinguishing whether the response records belonging to each of the small categories generated by the small category generating unit are construed to be common response records that are produced constantly over time or disturbances whose frequency exhibits a significant time dependency; and a skill estimating unit for estimating working skills of the agent in each of the large categories by using the common response records identified by the disturbance distinguishing unit.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 is a view showing an example of a screen on which information for each customer is specified.

FIG. 5 is a table showing an example of an incident to be referred by a topic classifier included in an embodiment of the present invention.

FIG. 6 is a table showing an example of classification rules included in the embodiment of the present invention.

FIG. 7 is a table showing an example of a topic-classified incident in the embodiment of the present invention.

FIG. 12 illustrates an example of output information of a disturbance distinguisher included in the embodiment of the present invention.

FIG. 14 illustrates an example of an agent skill table included in the embodiment of the present invention.

FIG. 16 illustrates an example of a disturbance influence table of a disturbance analyzer included in the embodiment of the present invention.

DESCRIPTION OF THE PREFERRED EMBODIMENTS

Hereafter, the embodiments of the present invention will be described with reference to the appended drawings. At first, the description will discuss the concept of the invention. Then, the concrete arrangements of the embodiments will be described.

Figure 1:
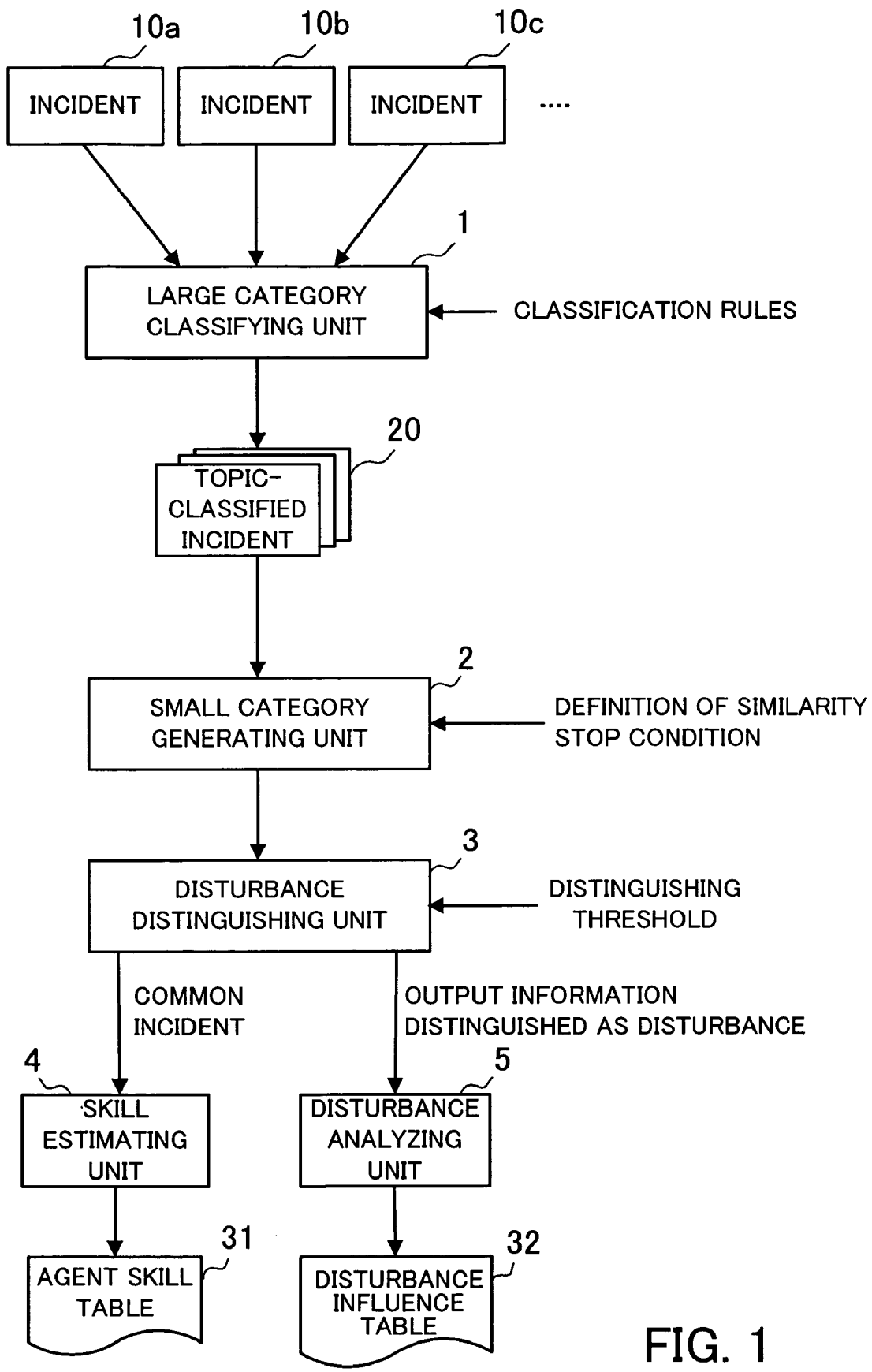
FIG. 1 is a concept view of the present invention.

FIG. 1 is a concept view of the invention.

When the working skill estimating program according to the present invention is executed by a computer, the computer serves as a working skill estimating apparatus, which includes a large category classifying unit 1, a small category generating unit 2, a disturbance distinguishing unit 3, a skill estimating unit 4, and a disturbance analyzing unit 5.

The large category classifying unit 1 is supplied with incidents 10a, 10b, 10c, . . . within a predetermined period through an agent's terminal. Then, the unit 1 classifies the incidents 10a, 10b, 10c, . . . according to predetermined classification rules. The predetermined period is specified as a time long enough for the apparatus to determine whether each given incident is a temporary disturbance, as well as to evaluate the growth of the agent's working skills. Each classification rule defines a set of keywords which are expected to be included in the incidents, in association with a large category to which an incident is classified if a specified number of words are found in it. Each incident contains a record an inquiry and a response to the inquiry. For example, one rule may be defined such that if the term "withdraw membership" as a keyword is detected in an incident, the incident will be classified into a large category "membership management". In the large categories are specified some topic categories on which the working skills of each agent is to be estimated, such as membership management, operation of connection, and request for documents. Keywords include special words that frequently occur in discussing those topics. For example, in the case of evaluating the skills in membership management tasks such as registration or deregistration of members, "membership management" is defined as one of the large categories and the terms "enrollment" and "withdraw membership" are defined as its corresponding keywords. Based on the classification rules defined as described above, the large category classifying unit 1 determines if an inputted incident includes one or more of those keywords and classifies the incident into the concerned large category according to the keywords that are found. This operation results in creating topic-classified incidents 20 each of which belongs to a particular large category (particular topic category).

The small category generating unit 2 collects similar incidents in each group of the topic-classified incidents 20 according to the definition of similarity and the stop condition and generates a small category from the collection of similar incidents. For creating the small category is used a hierarchical clustering method. This clustering method repeats a process of calculating similarity between any two clusters based on a distance (dissimilarity) function between the clusters (incidents) and coupling two clusters located closest to each other, that is, two clusters that are most similar to each other, until the stop condition is met. The resulting cluster represents a small category. In the meantime, the cluster similarity for separating disturbance is defined as a functions of (a) a ratio of incidents classified for each half of the predetermined period and (b) a similarity between words included in the incidents.

The hierarchical clustering method is well known. The details of the method are described in Toshihiro Kamishima, "A Survey of Recent Clustering Methods for Data Mining (part 1)," which is available at http://www.neurosci.aist.go.jp/~kamishima/REPOSITORY/2002-s-jsai-clustering-1.pdf".

The disturbance distinguishing unit 3 distinguishes if each incident belonging to a small category is common response records that are produced constantly over time or disturbances whose frequency exhibits a significant time dependency based on a distinguishing threshold. That is, based on the creation days and times of the incidents belonging to each small category generated by the small category generating unit 2, those incidents are classified into two groups in the following way. First, the predetermined period is divided into two periods, and then the ratio of incidents in the first half is compared with the ratio of those in the second half period. If the ratio of the first half is equal to that of the second half, those incidents are construed to be common response records that appear regularly over time. If the ratios are different from each other, those incidents are determined to be temporary disturbances. The determination criterion is predetermined as a distinguishing threshold.

The skill estimating unit 4 is supplied with the common incidents determined by the disturbance distinguishing unit 3 as being proper to estimating the working skill. Then, the skill estimating unit 4 estimates the working skills of the agent based on these common incidents and outputs the estimated result as an agent skill table 31. The working skills are evaluated for each large category (each topic category).

The skill estimating unit 4 may use a different skill evaluation algorithm other than the above, since various methods have been proposed in this technical field. The key point is that, according to the present invention, the skill estimation unit 4 can assume disturbance-free, time-independent incidents as its input data. Therefore, the working skill level of each agent can be properly estimated, whatever algorithms are used.

The disturbance analyzing unit 5 analyzes disturbance factors using all information outputted from the disturbance distinguishing unit 3, calculates the degree of influence caused by the disturbance factor, and outputs a disturbance influence table 32 based on the calculated result.

The foregoing each processing unit is implemented as computer processes executed according to the working skill estimating program.

The above working skill estimating apparatus operates as follows.

When the working skill estimating apparatus is supplied with the incidents 10a, 10b, 10c, . . . within a predetermined period, the large category classifying unit 1 collates the contents of inquiries and their responses included in those incidents 10a, 10b, 10c, . . . with the keywords defined according to the classification rules and, if one or more incidents are matched to the keywords, classifies those incidents into the concerned large category (topics). This causes the classified topics corresponding with the incidents to be specified and thereby the topic-classified incidents 20 to be generated. For example, the classified topics such as "membership management" and "Internet connection" are specified to each incident.

In succession, according to each classified large category (topics), the small category generating unit 2 sequentially couples the incidents until the stop condition is met according to the definition of the similarity, for generating some small categories. For example, if the large category is "membership management", the incidents in the large category are classified into the small categories such as "enrollment" and "withdraw membership."

Next, the disturbance distinguishing unit 3 distinguishes if the incidents in the small category correspond to the common information or the disturbance information according to the predetermined distinguishing threshold. Concretely, the unit 3 divides the incidents belonging to the small category into those of the first half period and those of the second half period, compares the ratio of the number of incidents of the first half period to the number of incidents of the second half period with the distinguishing threshold, and, if both of them are substantially same, assumes those incidents as the common response records that appear regularly over time. If the ratio exceeds the distinguishing threshold and the number of incidents of the first half period is not balanced with the number of incidents of the second half period, those incidents are determined to be the disturbance information. The value on which the incidents are determined as the disturbance information depends upon the distinguishing threshold.

According to each task, the skill estimating unit 4 estimates the working skills of each agent by using the common incidents distinguished as the common information and thereby generates the agent skill table 31. On the other hand, also according to each task, the disturbance analyzing unit 5 analyzes the disturbance based on the information outputted by the disturbance distinguishing unit 3, calculates the degree of influence caused by the disturbance, and then generates the disturbance influence table 32.

The foregoing working skill estimating apparatus classifies the incidents within a predetermined period into the small categories through the effect of the hierarchical clustering method and then distinguishes if the incidents of each small category correspond to the common information or the disturbance information. Then, the apparatus estimates the working skills of the agent per large category merely by using the incidents of the common information from which the disturbance factor is removed. Further, the influence caused by the disturbance factor is calculated also by using the incidents of the separated disturbance factor.

The separation of the disturbance factor from the incidents makes it possible to grasp the proper working skills of each agent. Further, the degree of the influence caused by the disturbance factor may be also grasped.

Hereafter, the embodiment of the present invention will be described in detail with reference to the appended drawings.

Figure 2:
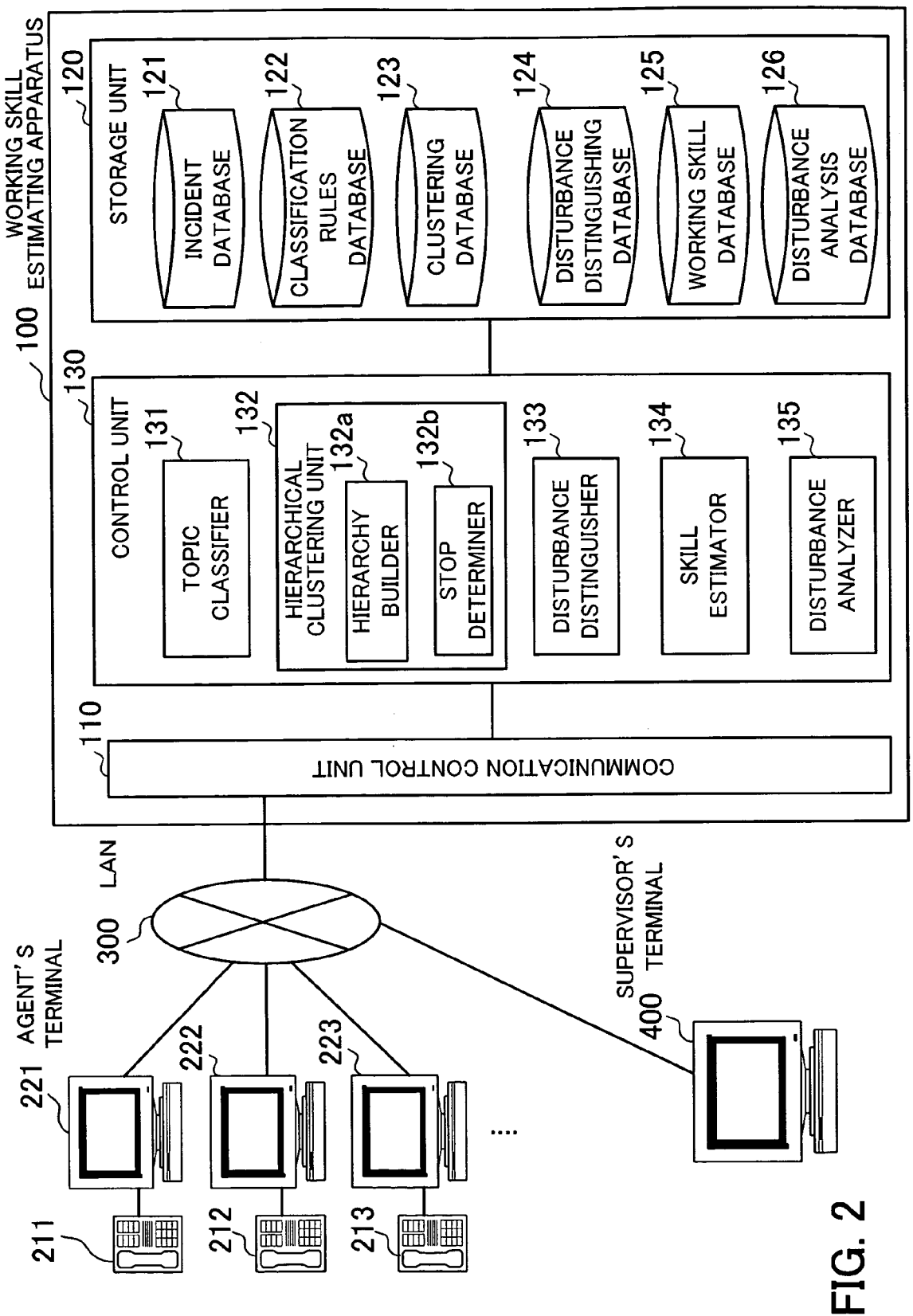
FIG. 2 is a diagram showing a working skill estimating system according to an embodiment of the present invention.

FIG. 2 is a diagram showing the working skill estimating system according to an embodiment of the present invention. This working skill estimating system includes a working skill estimating apparatus 100, agent's terminals 221, 222, 223, . . . , and a supervisor's terminal 400, all of which are connected through a LAN (Local Area Network) 300.

The agent's terminals 221, 222, 223, . . . are terminal devices connected with phones 212, 212, 223, . . . for accepting tasks of responding to customers through a public phone network or an IP network (not shown). After an agent executes the process of responding to a customer, the agent records the time information and the guiding contents about the response to the customer in the incident and transmits the incident to the working skill estimating apparatus 100 through the LAN 300. Instead, the incident may be held in another management server so that the incident may be transmitted from the management server to the working skill estimating apparatus 100 if necessary.

The supervisor's terminal 400 is a terminal device dedicated for a supervisor who manages the agents' works. This terminal 400 obtains the results of the agents' working skills estimated by the working skill estimating apparatus 100 and the calculated results of the influence caused by the disturbance through the LAN 300 and then shows these results to the supervisor.

The working skill estimating apparatus 100 is supplied with the incidents through the LAN 300 and carries out the processes of estimating the agents' working skills and calculating the influences caused by the disturbances based on the inputted incidents. This estimating apparatus 100 includes a communication control unit 110, a storage unit 120 and a control unit 130. The communication control unit 110 controls communications with the agent's terminals 221, 222, 223, . . . and with supervisor's terminal 400 through the LAN 300.

The storage unit 120 stores data required for various kinds of processes to be executed by the control unit 130. From a functional viewpoint, the storage unit 120 includes an incident database 121 for storing the inputted responses to customers, a classification rules database 122 for storing the classification rules to be used for a topic classifier 131 that classifies the incidents, a clustering database 123 for storing definitions of similarity and stop conditions to be used by the hierarchical clustering unit 132 for performing the hierarchical clustering process, a disturbance distinguishing database 124 for storing distinguishing thresholds to be used by a disturbance distinguisher 133 for distinguishing the common information from the disturbance information, a working skill database 125 for storing the results of the agents' working skills estimated by the skill estimator 134, and a disturbance analysis database 126 for storing the disturbance analyzed results such as influences caused by the disturbance. The details of the data to be stored in each database will be discussed later.

The control unit 130 includes the topic classifier 131, a hierarchical clustering unit 132 provided with a hierarchy builder 132a and a stop determiner 132b, the disturbance distinguisher 133, a skill estimator 134, and a disturbance analyzer 135, each of which will be described below.

The topic classifier 131 reads the classification rules stored in the classification rules database 122 and the incidents within a predetermined period stored in the incident database 121 and then classifies the incidents in a topic-by-topic manner according to the classification rules. The hierarchical clustering unit 132 reads the definitions of similarity and the stop conditions from the clustering database 123 and then generates a hierarchical cluster from the incidents of each topic classified by the topic classifier 131. The hierarchy builder 132a starts the process from the state in which each cluster is composed of a single incident and couples two clusters closest to each other, derived by the distance (dissimilarity) function between the clusters, according to the definition of similarity. The stop determiner 132b determines if the stop condition is met according to the process executed by the hierarchy builder 132a and causes the hierarchy builder 132a to repeat the process of coupling the clusters until the stop condition is met. The disturbance distinguisher 133 reads the distinguishing threshold from the disturbance distinguishing database 124 and distinguishes if each of the incidents composing the cluster corresponds to the common information or the disturbance information based on the distinguishing threshold in each top hierarchical cluster coupled by the clustering unit 132. The skill estimator 134 estimates the working skills of each agent by using only the common incidents distinguished as the common information by the disturbance distinguisher 133 and then stores the estimated result of the working skills in the working skill database 125. The disturbance analyzer 135 analyzes the disturbance by using all information outputted by the disturbance distinguisher 133, that is, the disturbance incidents distinguished as the disturbance information, analyzes the apparent influence on the agent's working skills caused by the disturbance, and then stores the disturbance analyzed result in the disturbance analysis database 126.

Figure 3:
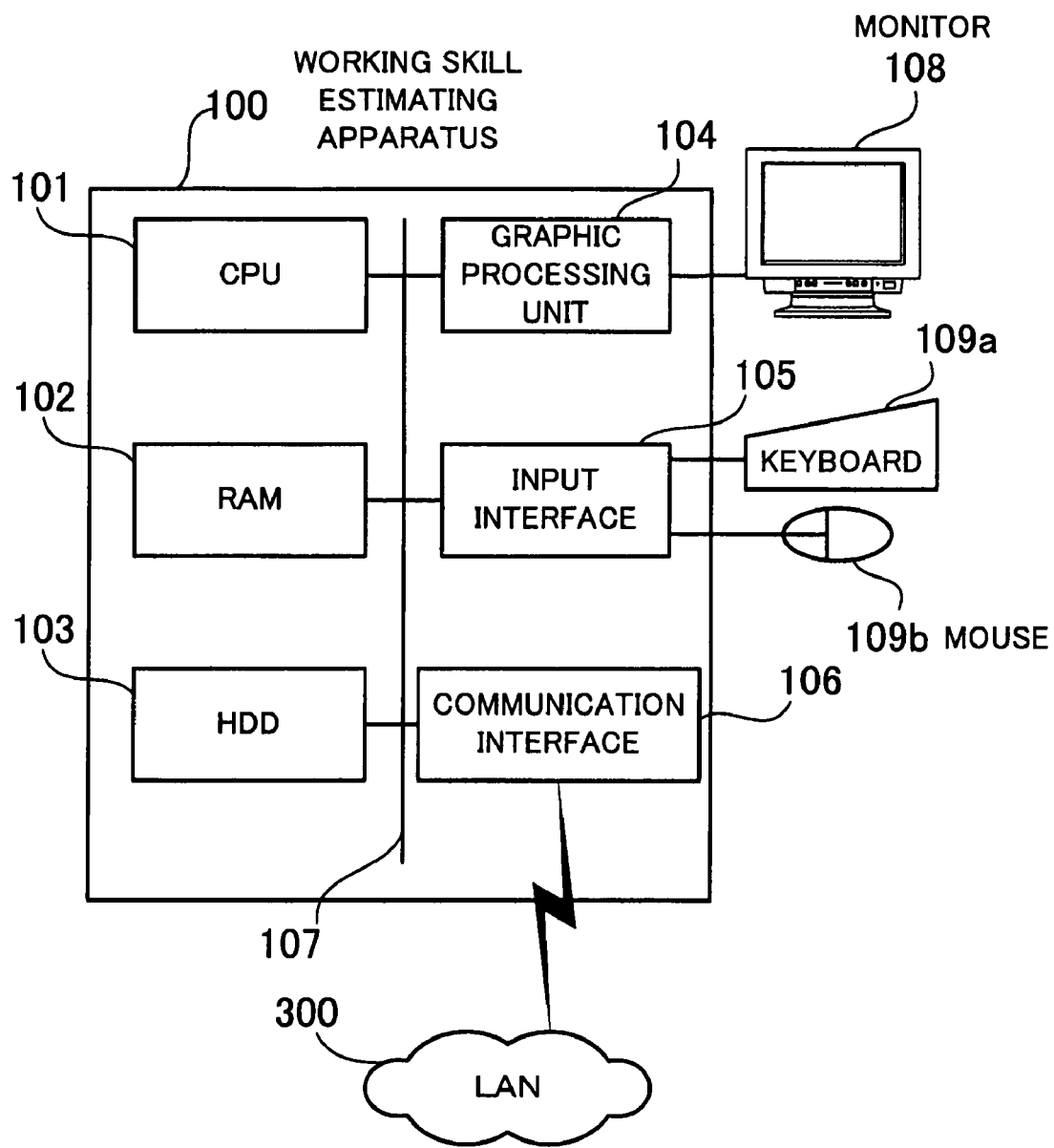
FIG. 3 is a block diagram showing a hardware arrangement of the working skill estimating apparatus according to an embodiment of the present invention.

In turn, the discussion will now turn to the hardware arrangement of the working skill estimating apparatus 100. FIG. 3 is a block diagram showing an exemplary hardware arrangement of the working skill estimating apparatus according to the embodiment of the invention.

The working skill estimating apparatus 100 is wholly under the control of the Central Processing Unit (CPU) 101. The CPU 101 is connected with a Random Access Memory (RAM) 102, a harddisk drive (HDD) 103, a graphic processing unit 104, an input interface 105, and a communication interface 106 through a bus 107, each of which will be described below.

The RAM 102 temporarily stores part of programs of the OS (Operating System) and application programs to be executed by the CPU 101. Further, the RAM 102 also stores various kinds of data required for the processes to be executed by the CPU 101. The harddisk drive 103 saves the OS and the application programs. The graphic processing unit 104 is connected with a monitor 108 so that an image may be displayed on screen of the monitor 108 in accordance with instructions given by the CPU 101. The input interface 105 is connected with a keyboard 109a and a mouse 109b so that the interface 105 may transmit the signals from the keyboard 109a and the mouse 109b to the CPU 101 through the bus 107. The communication interface 106 is connected with the LAN 300 so that the interface 106 may transfer data with the terminal devices through the LAN 300.

The foregoing hardware arrangement realizes the processing functions of this embodiment. In addition, the agent's terminal or the supervisor's terminal have the same hardware arrangement.

Next, the discussion will now turn to the operation of the working skill estimating system according to this embodiment and the working skill estimating method concerned therewith.

When an inquiry phone call from a customer reaches an agent, the agent responds to the customer's inquiry through the phone 211, 212, 213 or the like and at once handles his or her terminal 221, 222, 223 or the like for generating an incident. FIG. 4 shows an example of a screen of the agent's terminal on which a response to a customer is to be specified.

On the screen 230 where a response to a customer is to be specified, displayed on the agent's terminal 221, 222, 223 or the like, an agent enters data in each field. The data may be automatically specified by the terminal itself. The information about the response to a customer is divided into a record about a phone response to a customer and a record about a response content. The phone response record concerns with the information used for calculating a phone response time when the agent responds to a customer by phone. This record includes an arrival field 231 in which a phone arrival time is indicated, an end field 232 in which a speech-ended time is indicated, and a destination field 233 in which the agent who responds to the phone is indicated. Further, the response content record includes a start field 234 in which a time when the agent opens the incident, an end field 235 in which the agent closes the incident, an agent ID field 236 in which the agent having written data in the incident is indicated, an inquiry field 237 to which an inquiry content is supplied, and a response field 238 to which the response content is supplied. The agent's terminal 221, 222, 223 or the like extracts the data specified in each field and then transmits to the working skill estimating apparatus 100 the speech time data generated from the phone response record and the response record generated from the response content record. The working skill estimating apparatus 100 saves the obtained data in the incident database 121.

In the following description, unless specified, the response record created from the response content record is determined to be the incident.

In response to a start indication of estimating the agent's working skills, given by the supervisor's terminal 400, the control unit 130 of the estimating apparatus 100 starts its process so that it may cause the topic classifier 131 to be started.

[Process of Topic Classifier]

The topic classifier 131 reads the incidents within a predetermined period from the incident database 121 and the classification rules from the classification rules database 122. In the case of estimating the working skills of each agent, the data about the concerned agent is extracted on the concerned agent's ID, while in the case of estimating the overall working skill level, all the incidents are extracted irrespective of any agent's ID.

In turn, the discussion will now turn to the incidents to be referred by the topic classifier 131.

FIG. 5 shows an example of an incident to be referenced by the topic classifier. The incident 500 includes five fields concerned with an incident ID, a creation start day and time, a creation end day and time, an inquiry content, and a response content. The creation start day and time field 501 stores a day and time when a file is opened for writing the incident. The creation end day and time field 502 stores a day and time when the file is closed upon the end of write. The inquiry content field 503 stores an inquiry content from each customer as text data. The response content field 504 stores an agent's response content as text data. For example, for the incident identified by the incident ID "5230001", the creation start day and time is "Jan. 24,2005, 09:23:34", the creation end day and time is "Jan. 24,2005, 09:31:21", the inquiry content is "unable to connect to the Internet.", and the response content is "check for connection of a LAN cable."

Next, the classification rules will be described.

FIG. 6 shows an example of the classification rules. The classification rules 510 include a keyword field 511 and a large category name field 512. The keyword field 511 stores one of the inquiry content field 503 and the response content field 504 of the incident 500 or one or more keywords functioned as a key of classification, those words being included in the text data of both fields. Further, the large category name field 512 stores a large category name corresponding with a keyword. For example, consider the case that a first keyword is "Internet", the second keyword is "connect(ion)", and the large category name is "Internet connection". In this case, if the words "Internet" and "connect(ion)" are detected in the text data of the incident, the incident is classified into the large category name "Internet connection". This is set up as a new classification rule.

Moreover, the number of keywords to be specified is optional. The condition on which the new classification rule is established may be optionally specified as well, for example, the condition that all keywords are detected or the condition that any one of the keywords is detected. Hereafter, the description will be expanded on the assumption that the new rule is established when all the specified keywords are detected.

The topic classifier 131 collates the text data of the inquiry content or the response content of the incident with the keyword(s) according to the foregoing classification rules and, if matched, classifies the concerned incident into the large category name, for generating the topic-classified incident.

FIG. 7 shows an example of the topic-classified incident according to this embodiment. The topic-classified incident 520 includes an incident ID field, a creation start day and time field, a creation end day and time field, an inquiry word list field, a response word list field, and a topic (large category) field. The creation start day and time field and the creation end day and time field are the same as the creation start day and time field 501 and the creation end day and time field 502 of the incident 500. The inquiry word list field 521 stores the keywords retrieved from the inquiry content field 503 of the incident 500 and the retrieval times as list data. Likewise, the response word list field 522 stores the keywords retrieved from the response content field 504 of the incident 500 and the retrieval times as list data. The topic (large category) field 523 stores the large category name (task class name) prescribed according to the classification rules. For example, for the incident ID of "5230001", it is understood from the inquiry word list field 521 that the keyword "Internet" is detected once and the keyword "connect(ion)" is detected once. Further, it is also understood from the response word list field 522 that the keyword "LAN cable" is detected twice and the keyword "connect(ion)" is detected three times. Then, it is understood from the topic (large category) field 523 that the topic is classified into "Internet connection". In the foregoing description, the topic-classified incidents 520 and 500 are arranged as respective files. Those incidents may be arranged as one file. This holds true to the file stored with respect to the incident ID, created in the following process.

Figure 8:
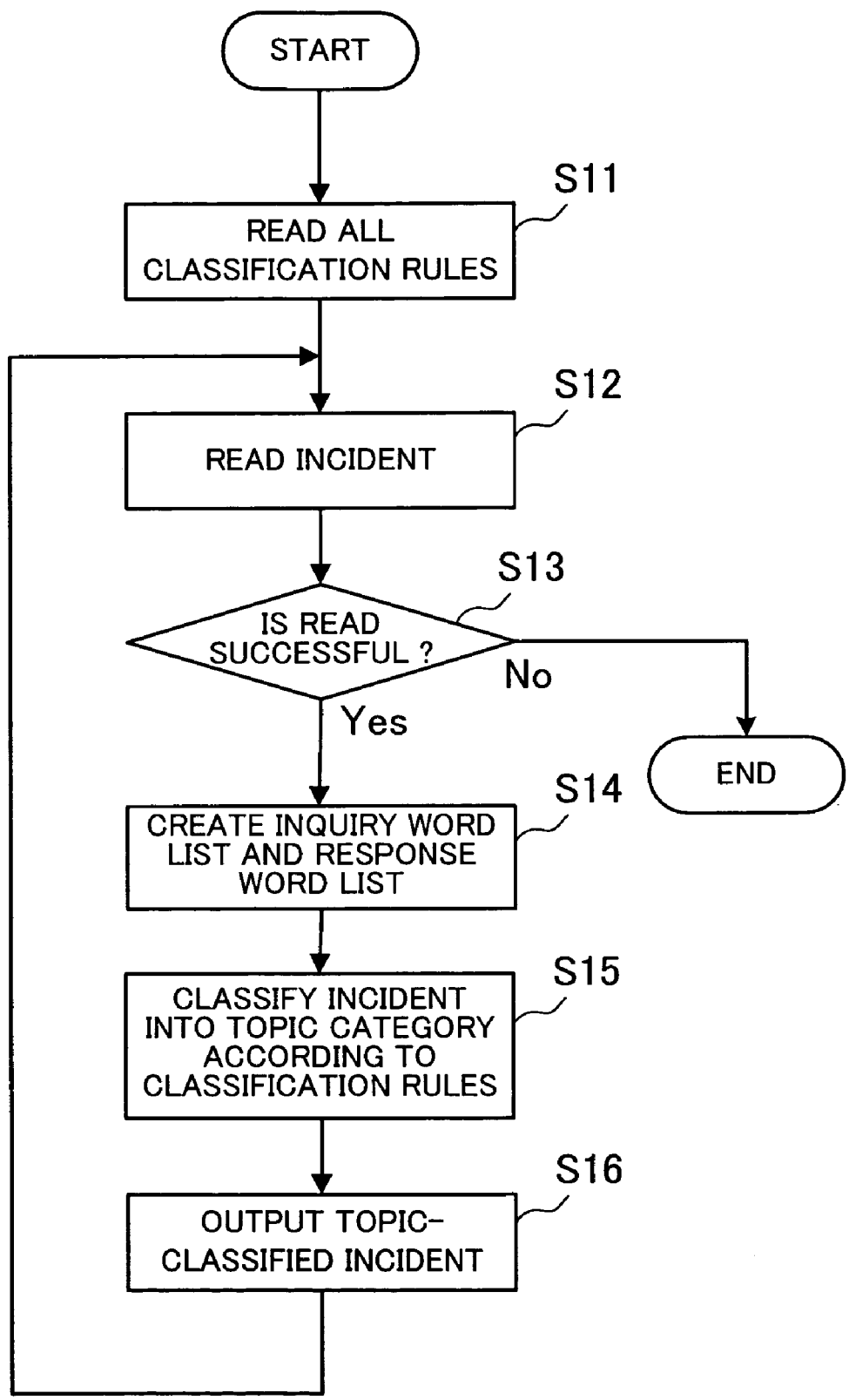
FIG. 8 is a flowchart showing a process executed by the topic classifier included in the embodiment of the present invention.

In turn, the discussion will now turn to the process of the topic classifier 131 according to this embodiment. FIG. 8 is a flowchart showing the process of the classifier 131.

[Step S11] All the classification rules are read from the classification rules database 122. As shown in FIG. 6, for the classification rules, the keywords and the large category names corresponding therewith are specified.

[Step S12] The incidents created within a predetermined period are retrieved from the incident database 121 and, if any, read in the classifier 131. If an agent is specified, the incident about the specified agent is selectively read. The incident includes an incident ID field, a creation start day and time field, a creation end day and time field, an inquiry content (text) field, and a response content (text) field.

[Step S13] It is determined if the concerned incident exists and the read of the incident is successful. If not successful (no concerned incident exists), the process is terminated.

[Step S14] The process is executed to collate the text data stored in the inquiry content field of the read incident with the keywords specified in the classification rules, calculate the matched keyword(s) and their times, and create an inquiry word list based on the calculated result. Likewise, the process is also executed to collate the text data of the response word content field of the incident with the keywords, calculate the matched keyword(s) and their times, and create a response word list.

[Step S15] The process is executed to specify the task class (large category) corresponding with the inquiry word list created about this incident and the keyword(s) in the response word list according to the classification rules.

[Step S16] The process is executed to output the incident ID, the creation start day and time, a creation end day and time, the inquiry word list and the response word list created in the step S14, and the task class (large category) created in the step S15, all of which are read from the incident, into the topic-classified incident 520. Then, the process goes back to the step S12.

The foregoing process results in classifying the incident into the large category (each task class) and creating the topic-classified incident. In succession, the hierarchical clustering unit 132 is started.

[Hierarchical Clustering Unit and Process of Disturbance Distinguisher]

The hierarchical clustering unit 132 performs the pre-process of separating the disturbance factor from the incident through the effect of the disturbance distinguisher 133. Hence, since the hierarchical clustering unit 132 is highly concerned with the disturbance distinguisher 133, hereafter, both will be described in concert.

At first, the disturbance factor will be described in detail.

Figure 9:
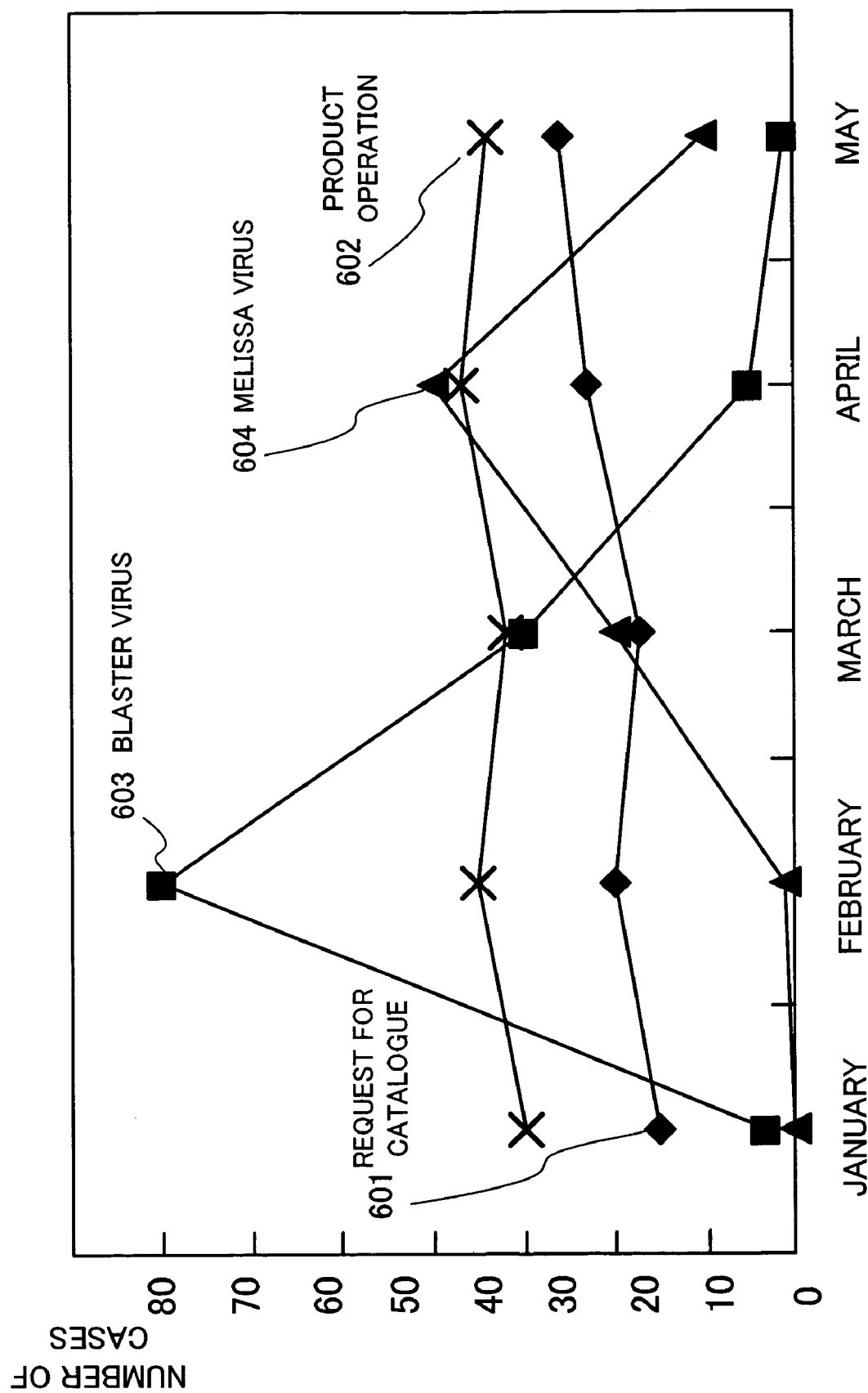
FIG. 9 illustrates an example of an inquiry content and a quantitative transition thereof.

FIG. 9 is a graph showing an example of a quantitative transition of each inquiry content. In FIG. 9, an axis of abscissas denotes a month, while an axis of ordinate denotes a number of cases for each category accepted in this month.

In the foregoing description, the disturbance is assumed to indicate a transient inquiry, that is, such inquiries that the inquiry cases are so variable in number that after those inquiry cases are decreased in a relatively short period of one or two months later, those inquiries hardly reach the agents. For example, in the illustrative examples, a request for catalogues 601 and an inquiry about product operations (a product operation 602 in this figure) are kept substantially constant every month, while the number of inquiries about Blaster viruses 603 is variable every month. The inquiries about Blaster viruses 603 are increased from January and reach the maximum in February. Afterwards, those inquiries are dropped in number and decreased to substantially zero in May. Further, the inquiries about Melissa viruses 604 are started from February and reach the maximum in April. Afterwards, those inquiries are curbed down. In addition to the measures for viruses, in a case that some defect (such as a defect on hardware or a security hole) is made public, the inquiries thereabout are curved similarly to the above virus inquiries.

In the hierarchical clustering unit 132, for the purpose of determining if the incident corresponds to the common response records that appear regularly over time or the disturbances whose frequency exhibits a significant time dependency, the process is executed to make each incident a cluster in the initial state and sequentially couple the analogous clusters for forming the hierarchical cluster. The hierarchical clustering process will be described below.

Figure 10:
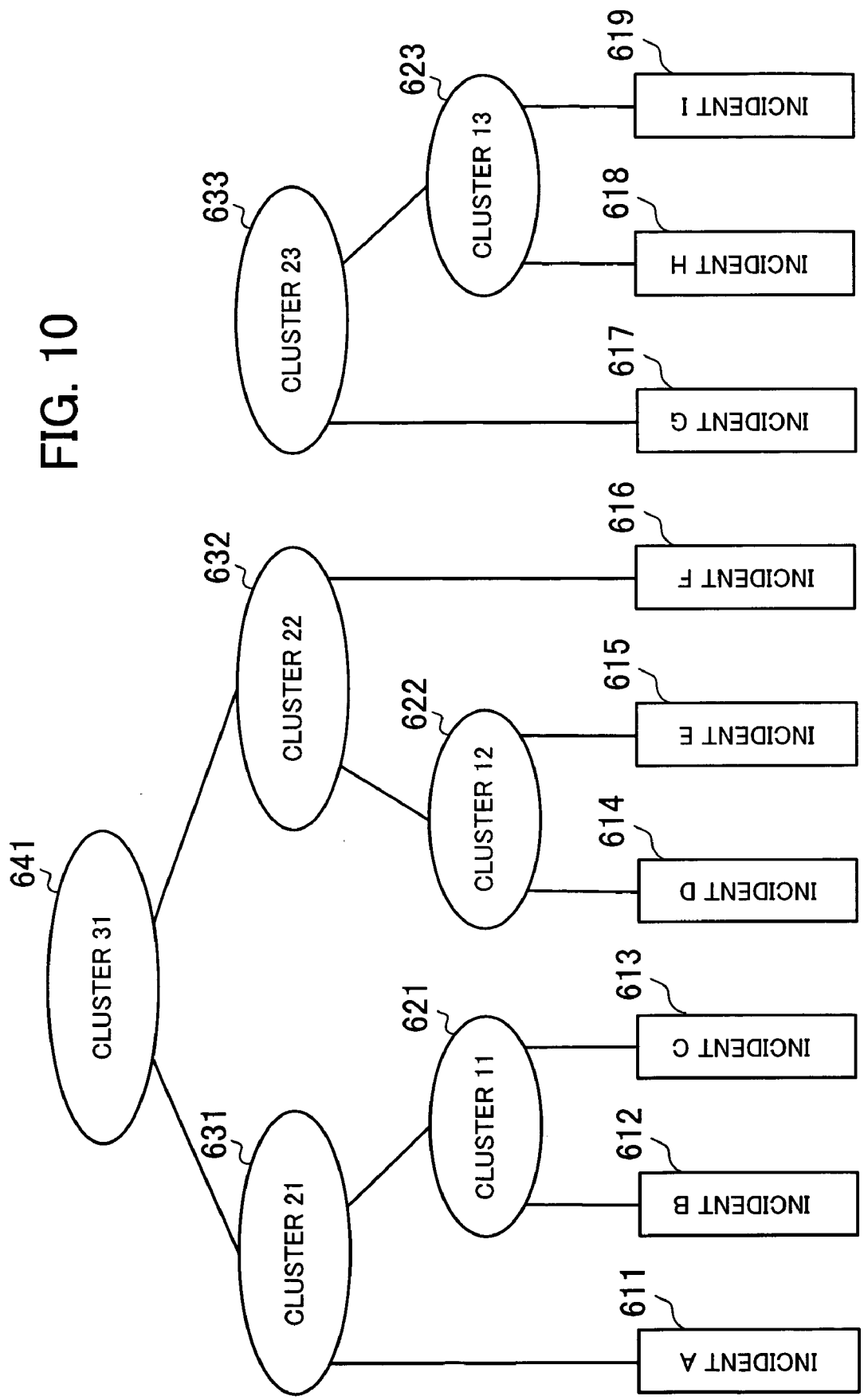
FIG. 10 illustrates a hierarchical clustering process included in the embodiment of the present invention.

FIG. 10 shows the hierarchical clustering process to be executed in this embodiment of the present invention. In starting the clustering process, that is, the initialization, the cluster is composed of one incident. In the illustrative configuration, an incident A (611), an incident B (612), an incident C (613), an incident D (614), an incident E (615), an incident F (616), an incident G (617), an incident H (618), and an incident I (619) located on the bottom layer correspond to respective clusters, that is, one incident for one cluster.

When starting the hierarchical clustering process, the similarity between the two clusters is calculated according to the defined similarity. Then, the two clusters with the largest similarity are coupled. In the illustration, since the similarity between the incident B (612) and the incident C (613) is the largest, those incidents B and C are coupled into a cluster 11 (621). Each time the two clusters are coupled, it is determined if the stop condition is met. Herein, since the stop condition is not met, the clustering process is proceeded. For example, the incident D (614) and the incident E (615) are coupled into a cluster 12 (622), the incident H (618) and the incident I (619) are coupled into a cluster 13 (623). Then, the incident A (611) and the cluster 11 (621) is coupled into a cluster 21 (631). Likewise, the cluster 12 (622) and the incident F (616) are coupled into a cluster 22 (632). The cluster 13 (623) and the incident G (617) are coupled into a cluster 23 (633). When the cluster 21 (631) and the cluster 22 (632) are coupled and the cluster 31 (641) is generated, the stop condition is met. Then, the clustering process is stopped. The clusters generated as above have hierarchical structure so that the cluster 31 (641) includes the cluster 21 (631) and the cluster 22 (632), the cluster 21 (631) includes the cluster 11 (621) and so on.

The discussion will now turn to the definition of the cluster similarity and stop condition for separating disturbance. In this embodiment, the similarity between two clusters is defined by combining similarity derived from temporal distribution of incidents with similarity in terms of the content of incidents belonging to the concerned two clusters.

The first similarity, that is, the similarity derived from temporal distribution of incidents, is calculated as follows: As stated above, the incidents are created during a predetermined period. The process of defining the first similarity is to divide the predetermined period into two halves, count the numbers of incidents in the first and the second half periods, calculate the ratio of incidents in each half to those in the entire period, and define the similarity as an absolute difference between the two ratios. That is, the first similarity F1 is calculated by the following expression:

$$F1=|(\text{ratio of incidents in the first half})-(\text{ratio of incidents in the second half})| \quad (1)$$

Next, the discussion will now turn to the second similarity, that is, the similarity of the incident contents of any two clusters. When coupling any two clusters, the similarity of the content is calculated between the incident optionally selected from the incidents belonging to one cluster one by one and the incident optionally selected from the incidents belonging to the other cluster one by one. The minimum similarity is let to be F2. For calculating the similarity of the content between the incidents is used the similarity between the word lists stored in the inquiry contents or the response contents, that is, the vector similarity.

By using the absolute value of F1 of the difference between the incident number for the first half and that for the second half in coupling the clusters and the minimum similarity F2 between the incidents belonging to these two clusters to be coupled, the similarity between the clusters is defined by as follows:

$$\text{Similarity between the clusters}=w1\times(1-F1)+w2\times F2 \quad (2)$$

wherein w1 and w2 are weight coefficients.

It is understood from the first half of the expression (2) that as the difference of the incident number between the first half and the second half is made smaller, that is, the incident number of the first half is closer to that of the second half, the similarity between the clusters is made higher. Likewise, it is also understood from the second half of the expression (2) that as the minimum similarity of the content between the incidents optionally selected from two clusters is made larger, the similarity between the clusters is made higher.

In turn, the stop condition is described. In the clustering process, though each cluster has the same number of incidents in the initial state, with advance of the process, the clusters are decreased and the incidents belonging to each cluster are increased. Further, since the coupling is proceeded from the two clusters with the highest similarity, also with advance of the process, the similarity is going smaller. Hence, as the stop condition, it is necessary to define the minimum value of the similarity between the clusters to be coupled or the maximum number of incidents belonging to one cluster. Both of the values may be specified to the stop condition.

Based on the foregoing definitions of the similarity between clusters and the stop condition, the hierarchical clustering unit 132 groups (clusters) the clusters having the analogous incident contents so that the incident number of the first half period may be closer to that of the second half period. When the similarity between the clusters to be coupled reaches the minimum value prescribed in the stop condition or the number of incidents belonging to the created cluster reaches the maximum value prescribed in the stop condition, it is determined that the stop condition is established, and then the clustering process is stopped.

Along the foregoing process, as shown in FIG. 10, the small category is created in which the analogous incidents are grouped.

In this embodiment, for determining whether or not the small category created as described above corresponds to the disturbance information, attention is focused on the ratio of the incident number of the first half to that of the second half, both of which belong to the small category. That is, when generating the small category, the clusters are grouped so that the incident number of the first half may be closer to that of the second half. Nonetheless, if both of the incident numbers are greatly different from each other, the small category is determined as the disturbance whose frequency exhibits a significant time dependency. If both of the incident numbers have a small difference, the small category is determined as the common information. This determination is on the basis of the distinguishing threshold, which is prescribed by the maximum value of F1 represented by the expression (1), for example.

In the following description, the predetermined period is specified as this month and the previous one, that is, two months, in which the first half period is the previous month and the second half period is this month.

Figure 11:
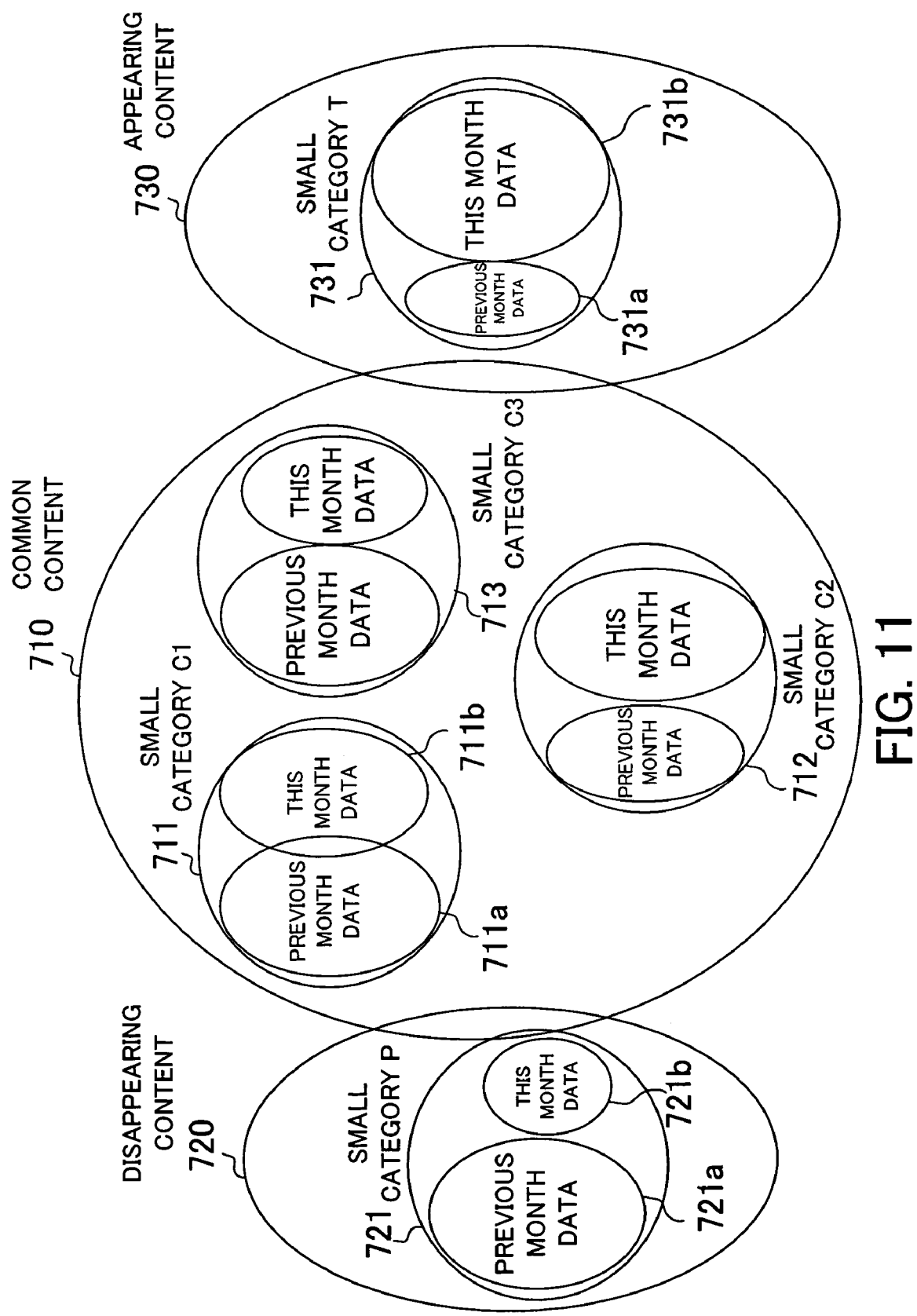
FIG. 11 illustrates an example of a clustering result included in the embodiment of the present invention.

FIG. 11 shows one example of the clustering result in this embodiment. In FIG. 11, the incidents belonging to the small category are classified according to their creation months, that is, this month or the previous month.

In the small category C1 (711), the incidents created in the previous month 711a are substantially equal in number to those created in this month 711b. Hence, small variation takes place between the incident numbers of the previous month and this month. Likewise, also in the small category C2 (712) and the small category C3 (713), small variation takes place between the incident numbers of the previous month and this month. As described above, if the small category has the substantially same incident number of the previous month as that of this month, the small category is classified into the common content 710.

On the other hand, the small category P (721) has the smaller incident number of this month 721b than that of the previous month 721a. It means that the number of the incidents is made smaller in this month and it is presumed that the occurrences of incidents will be decreased in near future. That is, if the small category has a smaller incident number of this month than that of the previous month, the small category is presumed to disappear in near future. Hence, this small category is classified into a disappearing content 720.

Further, the small category T (730) has more incidents of this month 731b than that of the previous month 731a. It means that the number of the incidents is made larger in this month and those incidents appear more frequently in this month. That is, if the small category has more incidents of this month than that of the previous month, the small category is classified into an appearing content 730.

As described above, the small category having a small difference of an incident number between this month and the previous month and classified into the common content 710 is determined as the common information. On the other hand, the small category having a large difference of an incident number between this month and the previous month and classified into the disappearing content 720 or the appearing content 730 is determined as the disturbance information. The obtained distinguished result is outputted as the output information of the disturbance distinguisher.

FIG. 12 shows an example of the output information from the disturbance distinguisher included in this embodiment. The output information 530 includes an incident ID field as a key field and a creation start day and time field, a creation end day and time field, a topic field, a small category field, and a disturbance distinguished result field in association with the incident ID field. The creation start day and time, the creation end day and time and the topic fields are the same as those of the topic-classified incident 520. The topic field 531 has the same content as the topic (large category) field 523 of the topic-classified incident 520 and thus indicates the topic into which the concerned incident is classified. In FIG. 12, the "recovery" is assigned to the topic.

The small category field 532 indicates a small category name in which the incidents are built by the clustering process executed by the hierarchical clustering unit 132. Further, in the disturbance distinguished result filed 533, the result concerns with the balance of the incident number between the first half and the second half, distinguished by the disturbance distinguisher 133, or the difference of the incident number therebetween, that is, the disturbance, distinguished by the distinguisher 133. In addition, the "balance" indicates that the incidents belonging to the small category are the common information. On the other hand, the "disturbance" indicates that the incidents belonging to the small category correspond to disturbance information. In FIG. 12, the incident of the ID "4950101" belongs to the small category of "CAT00523". This small category is indicated as "balance". Likewise, the incident of ID "4950104" belongs to the small category "CAT0012". This small category is distinguished as "balance". On the other hand, the small category "CAT01003" to which the incident of ID "4952923" belongs and the small category "CAT00173" to which the incident of ID "4953079" belongs are distinguished as "disturbance".

Figure 13:
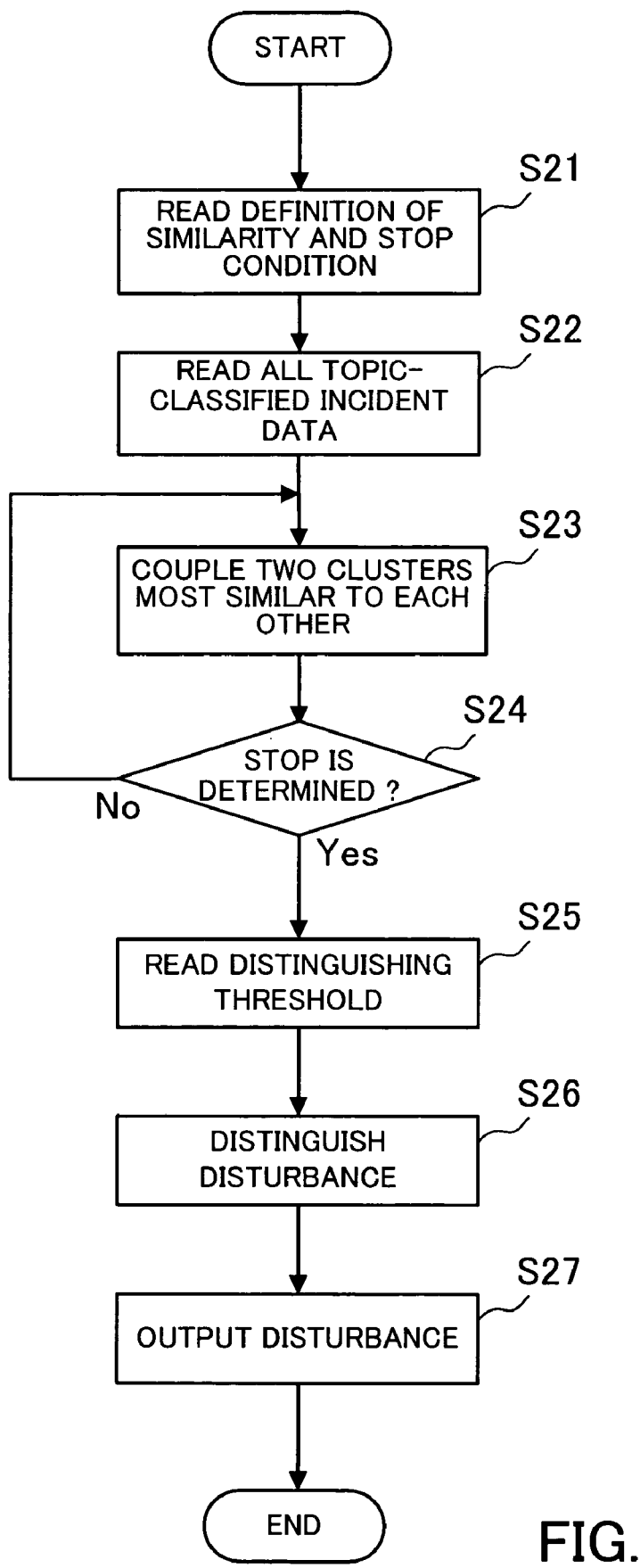
FIG. 13 is a flowchart showing a disturbance separating process included in the embodiment of the present invention.

In turn, the discussion will now turn to the process of separating the disturbance through the hierarchical clustering unit 132 and the disturbance distinguisher 133. FIG. 13 is a flowchart showing the disturbance separating process included in this embodiment.

[Step S21] the definition of the similarity and the stop condition are read from the clustering database 123. As indicated in the expression (2), the similarity is defined by the ratio F1 of the incident number of the first half period to that of the second half one and the similarity F2 of the incident content between any two clusters when coupling any two clusters. Further, the stop condition is defined by the maximum value of the incident number in the created cluster or the minimum value of the similarity between the clusters to be coupled.

[Step S22] The whole topic-classified incidents are read. In the initial state, each cluster is composed of one incident.

[Step S23] Based on the similarity between the clusters as indicated in the expression (2), the most similar clusters are coupled. This results in making it possible to couple two clusters having the substantially same ratio of incidents within the first half period as that within the second half one and the much closer similarity of the content to each other.

[Step S24] After the two clusters are coupled in the step S23, it is determined whether or not the stop condition is established. That is, if the number of incidents belonging to the created cluster exceeds the maximum value or the similarity between those clusters reaches the minimum value, the stop is determined. If not determined, the process goes back to the step S23, from which the next clustering process is started.

[Step S25] If the stop is determined, the disturbance threshold is read from the disturbance distinguishing database 124. The value of F1 on which the disturbance is determined is specified to the disturbance threshold. The value of F1 corresponds to an absolute value of a difference between the ratio of the incidents within the first half period and that within the second half period.

[Step S26] As to the cluster created at last, the value of F1 is compared with the distinguishing threshold obtained in the step S25, for distinguishing the disturbance. If the value of F1 of the cluster exceeds the distinguishing threshold, it indicates the "disturbed" state, that is, the concerned incident is determined as the disturbance information, while if it does not exceed the threshold, it indicates the "balanced" state, that is, the concerned incident is determined as the common information.

[Step S27] Based on the disturbance-distinguished result obtained in the step S26, the disturbance distinguisher 133 creates the output information 530 and then outputs it.

The foregoing process corresponds to the hierarchical clustering process of sequentially coupling the analogous incidents from the incidents belonging to each task type. Then, it is distinguished whether or not the cluster (small category) obtained at last corresponds to the disturbance based on the distinguishing threshold. In succession, the skill estimator 134 and the disturbance analyzer 135 are started.

[Process of Skill Estimator]

The skill estimator 134 is executed to calculate the working skills of each agent by using the incidents (common incidents) of the small category distinguished as the common information by the disturbance distinguisher 133.

The working skills of each agent are calculated by using the incidents belonging to the small category distinguished as the common information. In particular, the working skill level may be defined as:

$$\text{(Agent's Skill Level)} = 100 \times \text{(Agent's Productivity)} / \text{(Reference Value of Productivity)} \quad (3)$$

For example, letting the agent's productivity be the number of cases processed within the time specified, in the incidents having the same topic field of the output information (see FIG. 12) of the disturbance distinguisher created by the concerned agent, the incident cases in which the disturbance-distinguished result is distinguished as "balanced" are counted. The count result is the number of the agent's processed cases. Application of this count and the reference case number to the above-mentioned expression (3) makes it possible to calculate the agent's skill level. In this calculation, it is possible to add the by-phone responding time calculated when recording each incident of the agent to the expression (3). The calculated agent's skill level is outputted as an agent's skill table and then is stored in the working skill database 125.

FIG. 14 illustrates an example of the agent's skill table included in this embodiment.

The agent's skill table 540 stores the skill level of each agent. In the illustrative example, for each topic are prepared a membership management field, a "Internet connection" field, a recovery field, and a complaint field. The membership management field 541 stores the working skill level about the management of the members such as registration of an enrollment and withdraw membership. The "Internet connection" field 542 stores the working skill level about the responses to the inquiries of connecting to the Internet such as difficulty in connecting to the Internet. The recovery field 543 stores the working skill level about the response to inquiries of a recovery operation from the customers. The complaint field 544 stores the working skill level about the responses to the complaints from the customers.

In FIG. 14, a value of 100 indicates the ordinary agent's productivity. For example, about the agent A, the "membership management" is an ordinary level of "100", while the "Internet connection" is "160", the "recovery" is "120", and the "complaint" is "180", those of which exceed the ordinary level. Likewise, for the agent B, the "membership management" and the "recovery" are the ordinary level of "100", while the "Internet connection" is "80" and the "complaint" is "70", those of which are lower than the ordinary level.

The foregoing result is obtained from the common information separated from the disturbance. Based on this result, it is possible to precisely grasp the working skill level of each agent. This agent's skill table 540 indicates the following matters. For example, for enhancing the productivity, it is necessary to distribute the "Internet connection" inquiry and the "complaint" inquiry into the agent A, and the agent B is required to be trained about the responses to the inquiries of "Internet connection" and "complaint".

[Process of Disturbance Analyzer]

The disturbance analyzer 135 reads the information outputted from the disturbance distinguisher 133, analyzes the disturbance, and calculates the influence degree of the disturbance.

By analyzing the small category whose disturbance-distinguished result is determined as "disturbance" in the output information (see FIG. 12), it is possible to grasp the incidents distinguished as the disturbance information. The small category is automatically created by the hierarchical clustering process. Concretely, by retrieving the inquiry word list and the response word list of the topic-classified incident (see FIG. 7) based on each incident ID belonging to the concerned small category, the common keywords can be determined and the content of the small category can be grasped from the common keywords. As an example, if the virus name is detected as a common keyword, it indicates that the incident concerns with the inquiry about the virus.

In turn, the calculation of the influence degree of the disturbance will be described concretely along the calculation of the influence degree of the disturbance caused when calculating the skill growth of each agent.

Figure 15:
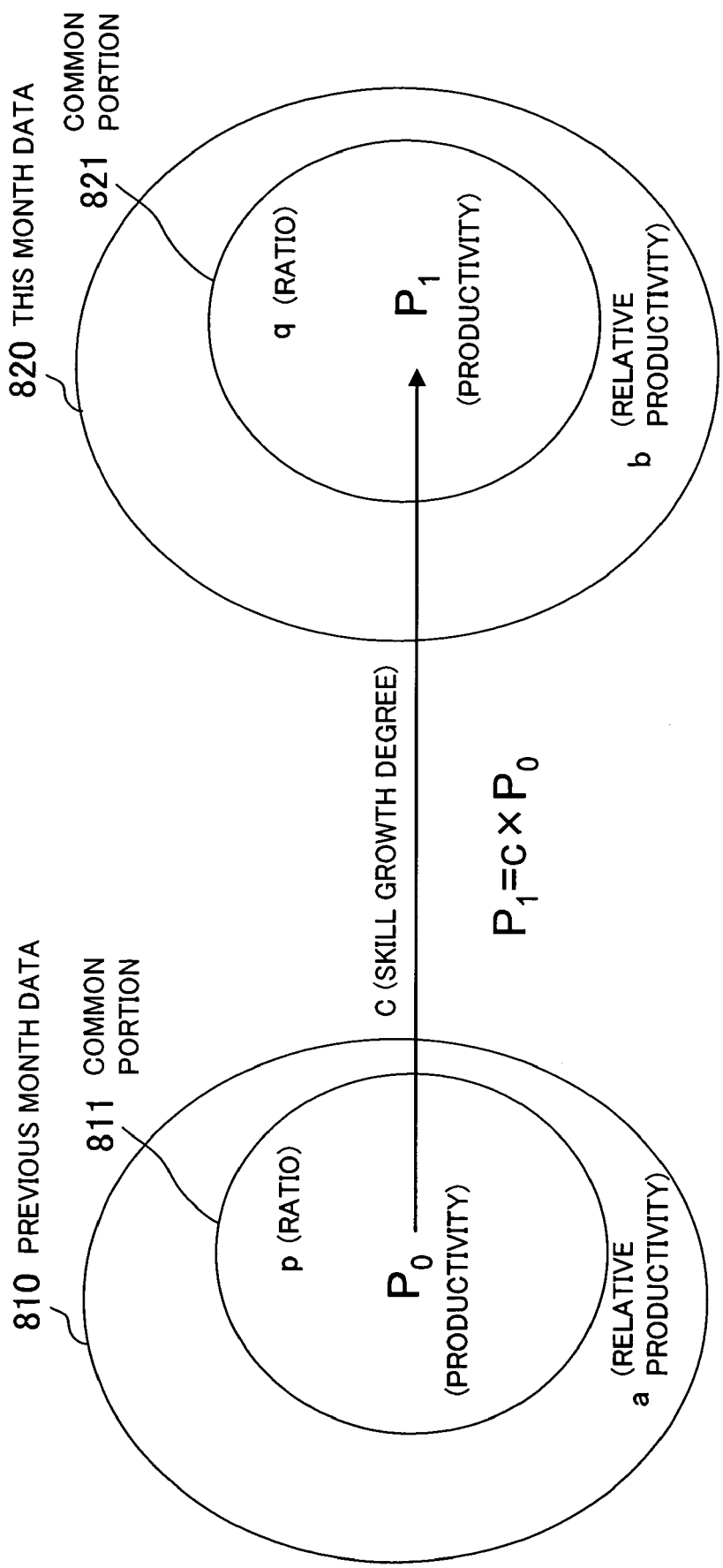
FIG. 15 is an explanatory view showing a skill growing degree of an agent and influence of a disturbance in the embodiment of the present invention.

At first, the discussion turns to the growth degree of each agent and the influence caused by the disturbance. FIG. 15 is an explanatory view showing the skill growth degree of an agent and the influence caused by the disturbance.

In FIG. 15, the previous month data 810 represents all incidents in the previous month about a concerned agent. The common portion 811 represents the incidents distinguished as the common information. Likewise, this month data 820 represents all incidents in this month about the concerned agent. The common portion 821 represents the incidents distinguished as the common information. The ratio "p" indicates a ratio of the common portion 811 to the previous month data 810, while the ratio "q" indicates a ratio of the common portion 821 to this month data 820.

Letting a relative productivity "a" be a productivity influenced by the disturbance to the productivity "$P_0$" calculated from the common portion 811 of the previous month data 810, the productivity of the previous month is represented by the following expression:

$$\text{Productivity of Previous Month} = \{p + (1-p) \times a\} \times P_0 \quad (4)$$

Likewise, letting a relative productivity "b" be a productivity influenced by the disturbance to the productivity "$P_1$" calculated from the common portion 821 of this month data 820, the productivity of this month is represented by the following expression:

$$\text{Productivity of This Month} = \{q + (1-q) \times b\} \times P_1 \quad (5)$$

The genuine skill growth degree of the agent can be obtained from the common portion from which the disturbance portion is removed. That is, though the genuine skill growth degree "c" is calculated by $P_1/P_0$, the apparent skill growth degree influenced by the disturbance is calculated simply by the ratio of all productivity of the previous month to all productivity of this month. Hence, the apparent skill growth degree influenced by the disturbance is calculated by the following expression:

$$\text{Apparent Skill Growth Degree} = c \times \{q+(1-q)\times b\}/\{p+(1-p)\times a\} \quad (6)$$

wherein a multiplier of the genuine growth degree c, $\{q+(1-q)\times b\}/\{p+(1-p)\times a\}$, corresponds to the influence degree of the disturbance.

As described above, the influence degree of the disturbance can be calculated. In this embodiment, when calculating the disturbance influence table, the influence degree of the disturbance is defined as follows:

$$\text{Influence Degree of Disturbance} = \{q+(1-q)\times b\}/\{p+(1-p)\times a\} - 1 \quad (7)$$

This expression is provided with the process of calculating a positive or negative difference between the apparent value and the genuine value for the purpose of more easily understanding the influence of the disturbance. The disturbance analyzer 135 calculates the influence degree of the disturbance by the expression (7) and creates the disturbance influence table.

FIG. 16 illustrates an example of the disturbance influence table created by the disturbance analyzer included in this embodiment.

The disturbance influence table 550 stores the above-described parameters and the influence degree of the disturbance calculated by the expression (7) for each task. An "a (previous month relative productivity)" field 551 stores a relative productivity of the disturbance portion to the common portion of the previous month. A "p (previous month common portion ratio)" field 552 stores a ratio of the common portion of the previous month. A "b (this month relative productivity)" field 553 stores a relative productivity of the disturbance portion to the common portion of this month. A "q (this month common portion ratio)" field 554 stores a ratio of the common portion of this month. A disturbance influence degree field 555 stores the influence degree of the disturbance for each topic calculated by the expression (7).

In the illustrative table, for the "membership management", the "a (previous month relative productivity)" is 0.8, the "p (previous month common portion ratio)" is 0.7, the "b (this month relative productivity)" is 0.85, and the "q (this month common portion ratio)" is 0.8. Hence, the influence degree of "+3%" is calculated through the expression (7).

Figure 17:
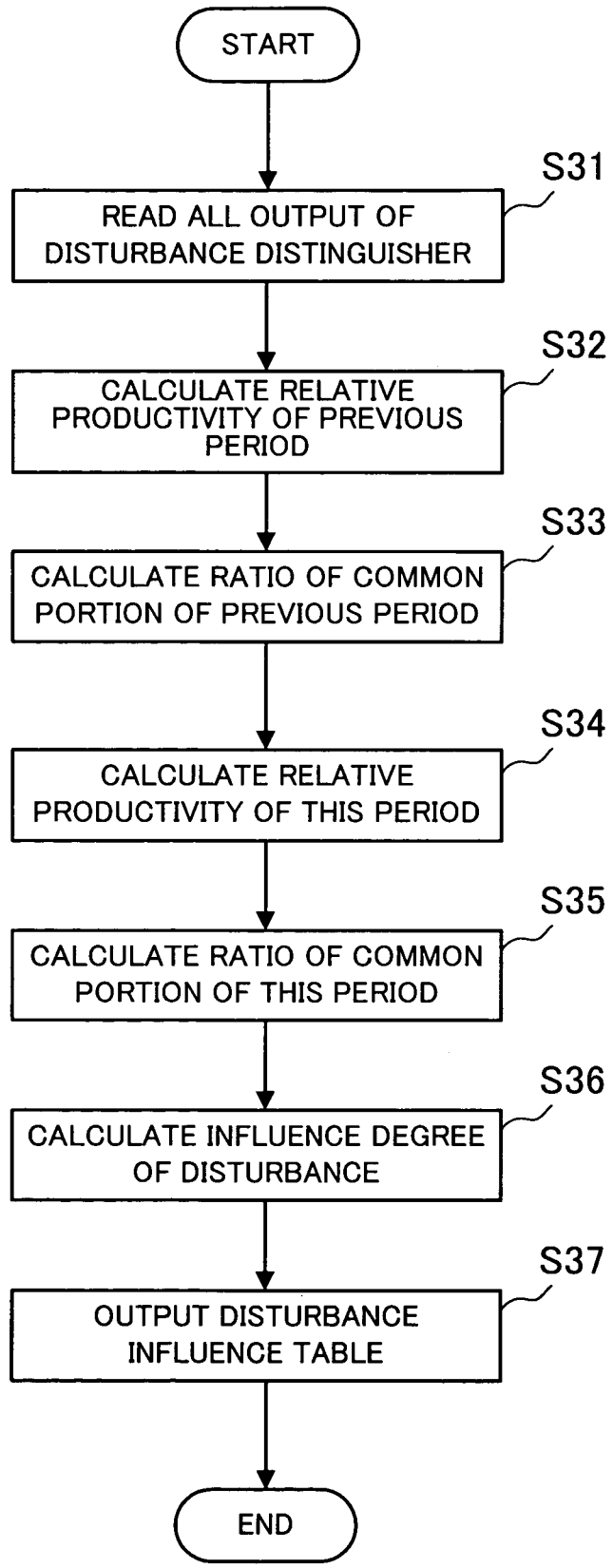
FIG. 17 is a flowchart showing a process of the disturbance analyzer included in the embodiment of the present invention.

Now, the discussion will now turn to the process of the disturbance analyzer 135. FIG. 17 is a flowchart showing the process of the disturbance analyzer included in this embodiment.

[Step S31] The process is executed to read all output of the disturbance distinguisher 133, that is, read the output information 530 of the disturbance distinguisher for all task types.

[Step S32] For each task type, the process is executed to calculate the productivity (relative productivity of the first half period) by using the incidents influenced by the disturbance in the first half period (within the first half period) derived by halving the predetermined period.

[Step S33] For each task type, the process is executed to calculate a ratio (ratio of the common portion of the first half period) of the incidents of the common portion of the first half period to all incidents of the first half period.

[Step S34] For each task type, the process is executed to calculate the productivity (relative productivity of the second half period) by using the incidents influenced by the disturbance in the second half period derived by halving the predetermined period.

[Step S35] For each task type, the process is executed to calculate a ratio (ratio of the. common portion of the second half period) of the incidents of the common portion of the second half period to all incidents of the second half period.

[Step S36] The process is executed to calculate the influence degree of the disturbance by applying the parameters calculated in the steps S32 to S35 into the expression (7).

[Step S37] The process is executed to create the disturbance influence table from the parameters calculated for each task type and the influence degree of the disturbance therefor and then output the disturbance influence table.

The execution of the foregoing process results in making it possible for the disturbance analyzer 135 to calculate the influence degree of the disturbance for each task type and then output the disturbance influence table. This table may provide the supervisor with the influence on the productivity of each task type, caused by the disturbance.

The foregoing processing functions may be realized by a computer. In this case, the computer is provided with a program in which is described the processing function to be included in the working skill estimating apparatus. The program run on the computer implements the foregoing processing function. The program in which the processing content is described may be recorded in a computer-readable recording medium. The recording medium may be a magnetic recording device, an optical disk, a magneto-optical recording medium or a semiconductor memory. The magnetic recording device includes a harddisk device, a flexible disk, and a magnetic tape. The optical disk includes a DVD (Digital Versatile Disk), a DVD-RAM (Random Access Memory), a CD-ROM (Compact Disk Read Only Memory), and a CD-R (Recordable)/RW (Rewritable). The magneto-optical recording medium may be an MO (Magneto-Optical) disk or the like.

For distributing the program in the market, for example, the program is sold in a portable recording medium such as a DVD or a CD-ROM. Instead, the program may be saved in a storage unit provided in a server computer and be transferred from the server computer to another computer through a network.

The computer stores in its storage unit the program recorded in the portable recording medium or transferred from the server computer. Then, the computer reads the program from its storage unit and executes the proper process under the control of the program. The computer may directly read the program from the portable recording medium and execute the proper process under the control of the program. Further, the computer may be executing the proper process under the control of the program being sequentially transferred from the server computer.

The working skill estimating apparatus operated under the control of the working skill estimating program according to the present invention classifies the incidents within the specified time according to respective topics, determines if the incidents belonging to each classified small category correspond to the disturbance information according to the similarity, and estimates the working skills of each agent based on the common information from which the disturbance information is removed. This estimating apparatus is advantageous in that the disturbances whose frequency exhibits a significant time dependency is automatically separated and only the common response records that appear regularly over time is used for estimating the working skills of each agent. As a result, this estimating apparatus allows a supervisor to grasp the proper working skills of each agent in light of the incidents from which the disturbances is separated.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable medium encoded with a working skill estimating program for estimating working skills of an agent, the program, when executed by a computer, causing the computer to function as:
   a large category classifying unit to classify response records collected during a predetermined period into large categories according to predetermined classification rules based on topics of inquiries and responses recorded in the response records;
   a small category generating unit to generate small categories by further classifying the response records belonging to each of the large categories according to a predetermined definition of similarity between individual response records;
   a disturbance distinguishing unit to classify the response records belonging to each of the generated small categories into common response records that are produced constantly over time or disturbances whose frequency exhibits a significant time dependency; and
   a skill estimating unit to select one of the large categories, extract the response records belonging to the selected large category while removing therefrom the response records of the small categories that the disturbance distinguishing unit has classified as disturbances, and estimate working skills of the agent in the selected large category, based on at least how many response records are extracted.

2. The computer-readable medium according to claim 1, wherein the small category generating unit uses a hierarchical clustering to collect similar response records, the small category generating unit comprising:
   a hierarchy building unit to build a hierarchical structure of clusters by repetitively producing a new upper cluster from two lower clusters having the highest similarity at present which are selected from among the clusters each containing at least one response record, based on the definition of similarity; and
   a stop determining unit to determine when to stop the process of building the hierarchical structure by the hierarchical building unit, according to a predetermined stop condition, so as to finalize the hierarchical structure of clusters.

3. The computer-readable medium according to claim 2, wherein:
   the hierarchy building unit evaluates the similarity between two clusters, based on a combination of first and second similarities thereof;
   the first similarity is defined as an absolute difference between a ratio of the response records created during a first half of the predetermined period and a ratio of the response records created during a second half of the predetermined period; and
   the second similarity is similarity in content between every two response records belonging to the two clusters in question.

4. The computer-readable medium according to claim 3, wherein the first similarity is higher as the absolute difference between the ratios is smaller.

5. The computer-readable medium according to claim 3, wherein:
   the small category generating unit compares every possible pair of response records each belonging to the two clusters in question, so as to evaluate similarity in terms of words contained therein; and
   a higher value of the second similarity is given to the two clusters if a higher minimum similarity is observed in the words contained therein.

6. The computer-readable medium according to claim 2, wherein:
   the stop determining unit determines whether the stop condition is met each time a new cluster is created; and
   the stop condition specifies either or both of a maximum number of response records that each cluster is allowed to contain and a minimum similarity requirement that every two clusters to be coupled should satisfy.

7. The computer-readable medium according to claim 1, wherein:
   the classification rules each give a particular large category name in association with a set of keywords that are supposed to appear in response records of that large category; and
   the large category classifying unit retrieves the keywords contained in the response records and, based on the classification rules, allocates to the response records the large category name associated with the retrieved keywords.

8. The computer-readable medium according to claim 7, wherein:
   each response record comprises an inquiry content field containing details of an inquiry and a response content field containing details of a response to the inquiry; and
   the large category classifying unit retrieves the keywords from either or both of the inquiry content field and the response content field.

9. The computer-readable medium according to claim 1, further causing the computer to function as a disturbance analyzing unit to calculate how much the disturbances have influenced productivity of the agent, by using the response records distinguished as the disturbance information or the common information by the disturbance distinguishing unit.

10. The computer-readable medium according to claim 9, wherein:
    the disturbance analyzing unit calculates the influence of the disturbances, based on a relative productivity influenced by the disturbance in a first half of the predetermined period, a relative productivity influenced by the disturbances in a second half of the predetermined period, a ratio of common response records to a whole of the response records in the first half of the predetermined period, and a ratio of common response records to the whole response records in the second half of the predetermined period.

11. The computer-readable medium according to claim 1, wherein the disturbance distinguishing unit classifies the response records by dividing the response records in a given small category into two groups depending on whether the response records are collected in a first half or a second half of the predetermined period, comparing ratios thereof, and classifying the response records in the given small category as common response records when said comparison. finds substantially equal ratios of the two groups, or as disturbances when said comparison finds different ratios of the two groups.

12. A working skill estimating apparatus for estimating working skills of an agent, the apparatus comprising a computer with a storage unit which operates as:

a large category classifying unit to classify response records which are collected during a predetermined period and stored in the storage unit of the computer into large categories according to predetermined classification rules based on topics of inquiries and responses recorded in the response records;

a small category generating unit to generate small categories by further classifying the response records belonging to each of the large categories according to a predetermined definition of similarity between individual response records;

a disturbance distinguishing unit to classify the response records belonging to each of the generated small categories into common response records that are produced constantly over time or disturbances whose frequency exhibits a significant time dependency; and a skill estimating unit to select one of the large categories, extract the response records belonging to the selected large category while removing therefrom the response records of the small categories that the disturbance distinguishing unit has classified as disturbances, and estimate working skills of the agent in the selected large category, based on at least how many response records are extracted.

13. A working skill estimating method executed by a computer with a storage unit for estimating working skills of an agent, the method comprising:

(a) classifying, by the computer, response records which are collected during a predetermined period and stored in the storage unit into large categories according to predetermined classification rules based on topics of inquiries and responses recorded in the response records;

(b) generating, by the computer, small categories by further classifying the response records belonging to each of the large categories according to a predetermined definition of similarity between individual response records;

(c) classifying, by the computer, the response records belonging to each of the generated small categories into common response records that are produced constantly over time or disturbances whose frequency exhibits a significant time dependency; and (d) selecting, by the computer, one of the large categories, extracting the response records belonging to the selected large category while removing therefrom the response records of the small categories that said classifying has classified as disturbances, and estimating working skills of the agent in the selected large category, based on at least how many response records are extracted.

* * * * *